United States Patent [19]
Bogiel et al.

[11] Patent Number: 5,162,614
[45] Date of Patent: Nov. 10, 1992

[54] RACEWAY FOR HOUSING ELECTRICAL COMPONENTS

[75] Inventors: Steven B. Bogiel, Schaumburg; Mark M. Data, Bolingbrook; Robert DeRoss; David M. Skowronski, both of Naperville, all of Ill.

[73] Assignee: Molex Incorporated, Lisle, Ill.

[21] Appl. No.: 686,326

[22] Filed: Apr. 16, 1991

[51] Int. Cl.$^5$ .................... H02G 3/26; H02G 3/04
[52] U.S. Cl. ........................ 174/97; 174/48; 174/49; 174/68.3; 174/101; 138/168; 138/156; 138/92; 16/225; 16/DIG. 13
[58] Field of Search .............. 174/97, 48, 49, 68.3, 174/101; 138/162, 163, 166, 168, 157, 156, 128, 92; 439/207, 209, 211, 120, 596; 16/225, DIG. 13, DIG. 33; 248/205.1, 906, 301

[56] References Cited

U.S. PATENT DOCUMENTS

| | | | |
|---|---|---|---|
| 2,978,020 | 4/1961 | Paulsrude | 16/225 X |
| 3,326,268 | 6/1967 | Dixon | 16/225 X |
| 3,441,975 | 5/1969 | Shepherd | 16/225 |
| 3,759,297 | 9/1973 | Anderson et al. | 174/48 X |
| 3,786,171 | 1/1974 | Shira | 174/101 X |
| 4,255,610 | 3/1981 | Textoris | 174/48 X |
| 4,423,284 | 12/1983 | Kaplan | 174/101 |
| 4,811,760 | 3/1989 | Van Kirk et al. | 138/92 X |
| 4,828,132 | 5/1989 | Francis, Jr. et al. | 16/225 X |

Primary Examiner—Leo P. Picard
Assistant Examiner—Hyung S. Sough
Attorney, Agent, or Firm—Stephen Z. Weiss

[57] ABSTRACT

A longitudinal raceway is provided for housing electrical components such as in a space-dividing wall structure or the like. The raceway includes a pair of elongated raceway sections which, when in longitudinal juxtaposition, define a generally closed hollow structure for concealing and protecting the electrical components. A hinge is connected between adjacent longitudinal sides of the raceway sections whereby the sections are movable about the hinge between open and closed positions. Complementary interengaging latches are provided on the opposite longitudinal sides of the raceway sections to hold the sections in the closed position.

10 Claims, 3 Drawing Sheets 5,162,614

RACEWAY FOR HOUSING ELECTRICAL COMPONENTS

FIELD OF THE INVENTION

This invention generally relates to the art of electrical connection and distribution systems and, particularly, to a raceway for housing electrical components such as connectors, circuitry and the like.

BACKGROUND OF THE INVENTION

There are various applications or environments wherein structural raceways are used to house electrical components and/or circuitry to hide the circuitry, to protect the circuitry or for other purposes.

An example of such an environment is in space divider systems for dividing offices or other interior regions into smaller work areas. Such systems normally include a plurality of upright panels releasably joined together, and, in contemporary environments, the panels are individually prewired, with electrical connectors or terminating power blocks of adjacent panels being joined by flexible electrical components. Such systems afford the user high flexibility in arranging and rearranging work areas to meet changing work situations.

Delivery of necessary power and communications service to the various work areas normally is accomplished in one of two methods. Each wall panel may be prewired or a power supply and communications system may be installed in longitudinal recessed areas of the panels or under the bases of the wall panels. In the latter systems, normally a power and communication raceway structure normally extends longitudinally of the panels to facilitate the extension of both electrical and communication circuitry along the system in an efficient yet hidden and protected manner, still providing utilization of the circuitry at selected locations.

Although known raceway systems have proven highly desirable and have met with success, there nevertheless is continued attempts to improve the manufacture, usability, flexibility, dependability and convenience of such systems, particularly in endeavors to incorporate the power and communications structural raceway as an integrally associated component of panel divider systems. Accordingly, this invention relates to improvements in raceway structures of the character described.

SUMMARY OF THE INVENTION

An object, therefore, of the invention is to provide a new and improved raceway structure for housing electrical components.

In the exemplary embodiment of the invention, a pair of elongated raceway sections are provided such that, when in longitudinal juxtaposition, the sections define a generally hollow closed structure for concealing and protecting the electrical components. Hinge means are connected between adjacent longitudinal sides of the raceway sections whereby the sections can be moved between open and closed positions. Complementary interengaging latch means are provided on the opposite longitudinal sides of the raceway sections to hold the sections in the closed position.

As disclosed herein, the raceway sections are unitary plastic components and the complementary interengaging latch means are formed unitary with the raceway sections. The latch means include hooks for snapping into locking engagement.

The hinge means are provided in the form of a web extending lengthwise of the raceway sections. The sections have sockets longitudinally thereof, and the web has enlarged portions for positioning in the sockets. A first alternative includes the two raceway sections and the web section manufactured separately and joined longitudinally by chemical, heat or sonic welding methods as are common in the art. A second alternative includes the coextrusion of the raceway and web sections unitarily formed.

In the preferred embodiment of the invention, the raceway sections are generally U-shaped in cross-section with each section having two leg portions joined at proximal ends by a bight portion. The hinge means and the complementary interengaging latch means are provided at the distal ends of the leg portions of the U-shaped sections.

It is contemplated that the raceway sections can be extruded of dielectric material, such as plastic or the like. Therefore, the raceway sections simply are cut to desired lengths to provide a closed raceway of that length when the sections are interengaged.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
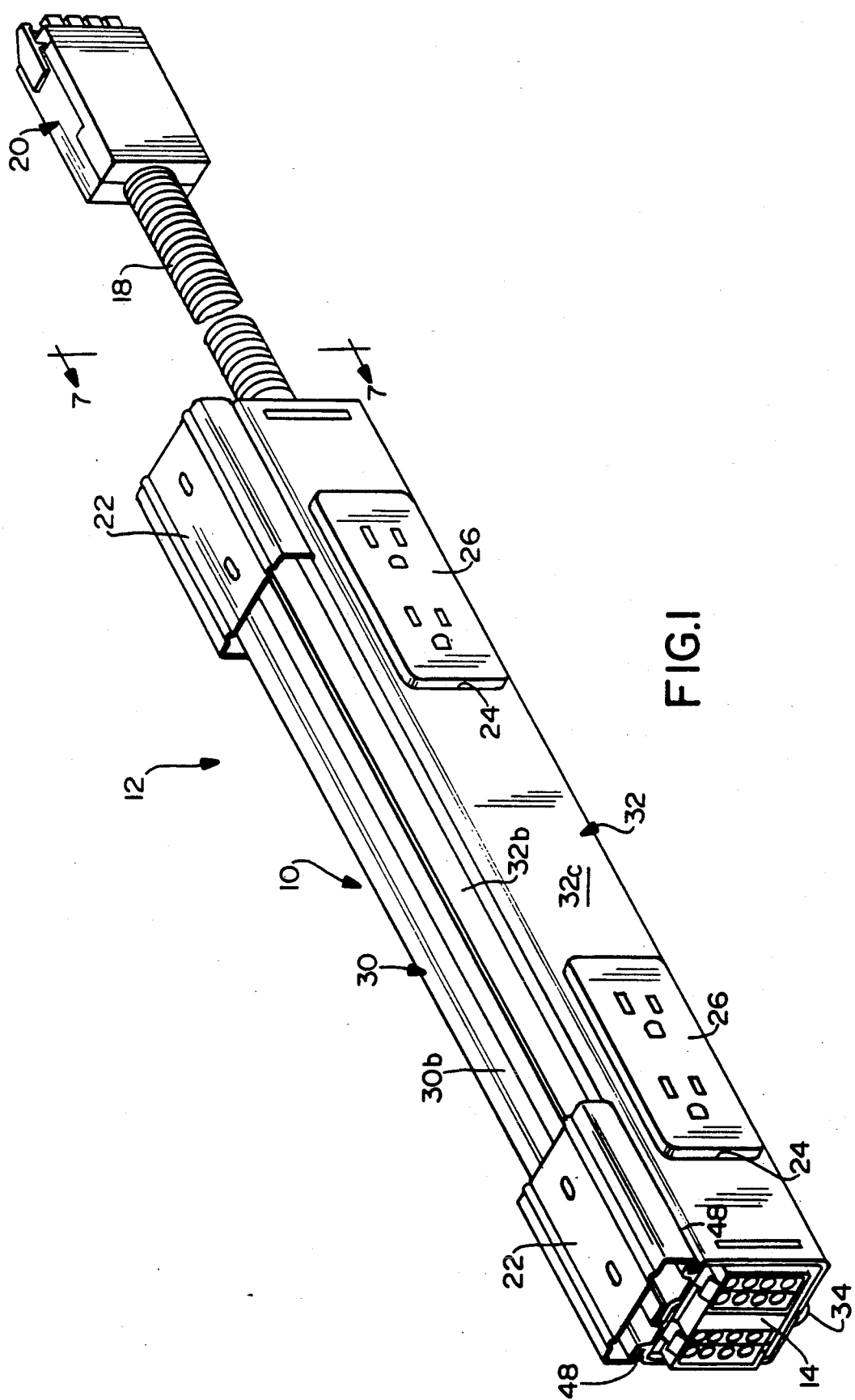
FIG. 1 is a perspective view of a power supply system as might be used in a modular wall panel system, and including the raceway structure of the invention.

Referring to the drawings in greater detail, and first to FIG. 1, the invention is incorporated in a raceway, generally designated 10, which forms a component of a power supply system, generally designated 12, which may be used in conjunction with a modular wall panel system. For instance, supply system 12 may be provided in a bottom recessed area along the bottom edge of a single wall panel of the modular wall panel system. In the alternative, the supply system 12 may be provided in a recessed area in the top or side areas of a wall panel system or in modular furniture.

Power supply system 12 includes an electrical connector, generally designated 14, within one open end 16 of raceway 10. A connector 15 is located in the other open end 17 of raceway 10. A flexible conduit 18 also projects outwardly from the other open end 17 of raceway 10. Another electrical connector, generally designated 20, is electrically coupled to the power wires or lines within flexible conduit 18. As an example, connector 20 may comprise a plug connector and connector 14 may comprise a receptacle connector. Therefore, plug connector 20 can connected to a receptacle connector 14 of another power and communications supply system 12 in an adjacent wall panel of the modular wall panel system. Of course, it must be understood that supply system 12 is but an example of the utility of raceway 10 which incorporates the concepts of the invention.

Figure 5:
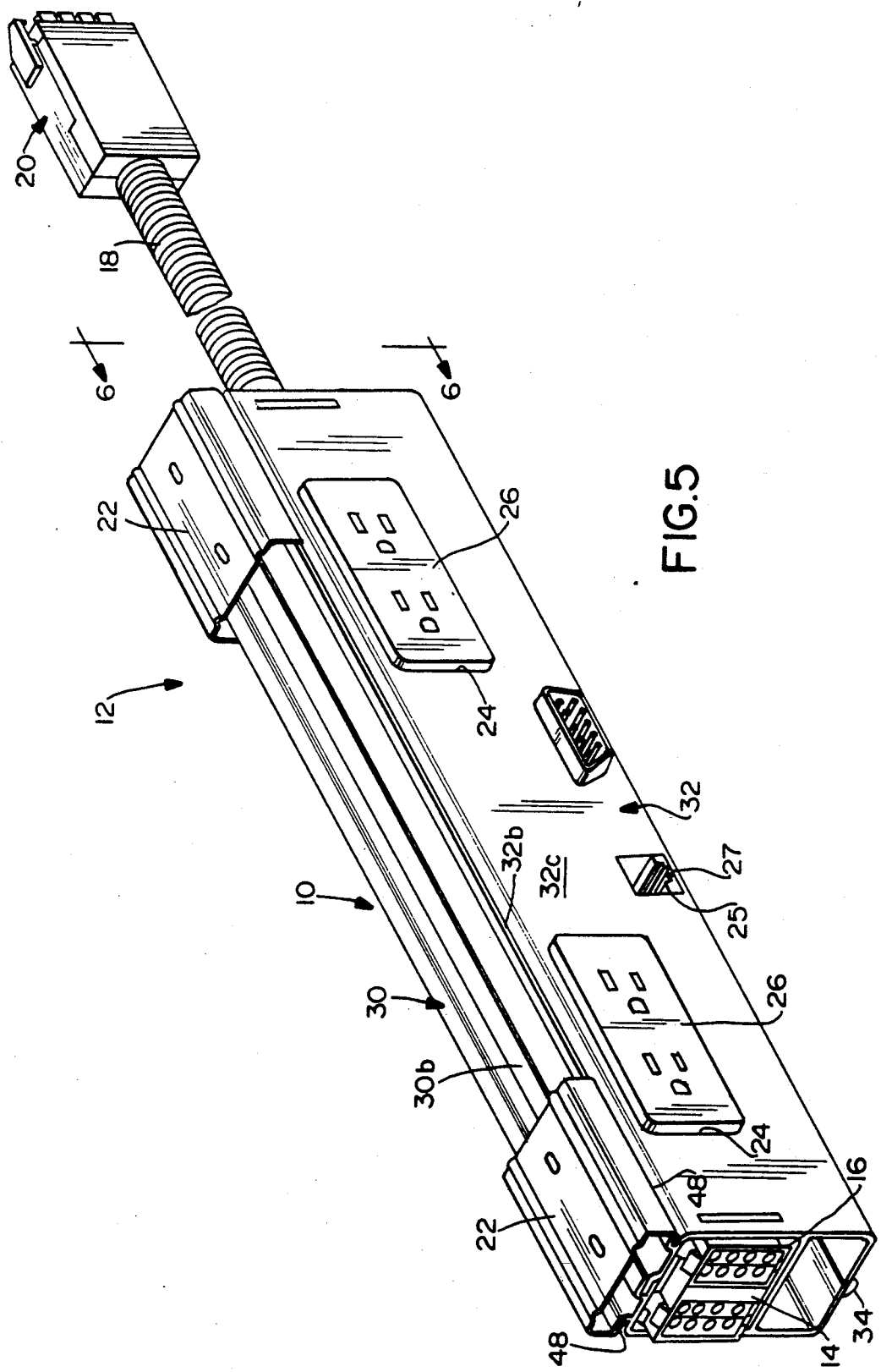
FIG. 5 is a perspective view showing a communications as well as power supply system.

For instance, raceway 10 may interengage with other components such as mounting brackets 22 to facilitate mounting the raceway within or along the bottom of a wall panel. In addition, raceway 10 may include side apertures 24 within which are mounted conventional receptacles 26 and in FIG. 5 side apertures 25 within which are mounted conventional telecommunication receptacles 27. It can be seen that each receptacle 26 has a pair of "three-prong" arrays of holes for receiving conventional grounded electrical plugs. Appropriate terminal contacts are provided within raceway 10 in communication with the holes to terminate the conventional grounded plugs to electrical and, as shown in FIG. 5, communications circuitry within the raceway and coupled between connectors 14 and 15.

Figure 2:
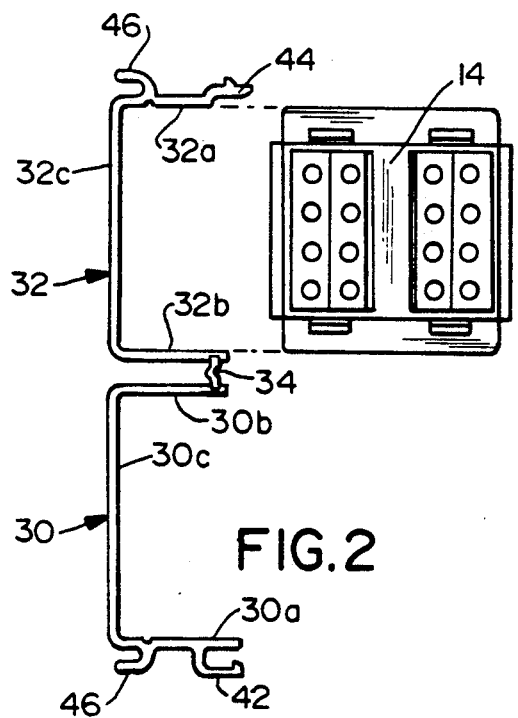
FIG. 2 is an end elevational view, looking toward the left-hand end of FIG. 1, and illustrating the raceway in open condition in conjunction with an electrical connector.

Referring to FIG. 2 in conjunction with FIG. 1, the invention contemplates that raceway 10 be fabricated of a pair of elongated generally U-shaped sections, generally designated 30 and 32. U-shaped raceway section 30 includes two leg portions 30a and 30b joined by a bight portion 30c. Likewise, U-shaped raceway section 32 includes two leg portions 32a and 32b joined by a bight portion 32c. Raceway sections 30 and 32 are designed such that, when in longitudinal juxtaposition, the raceway sections define a generally hollow closed structure for concealing and protecting the electrical components therewithin, as seen in FIGS. 1 and 2.

Figure 3:
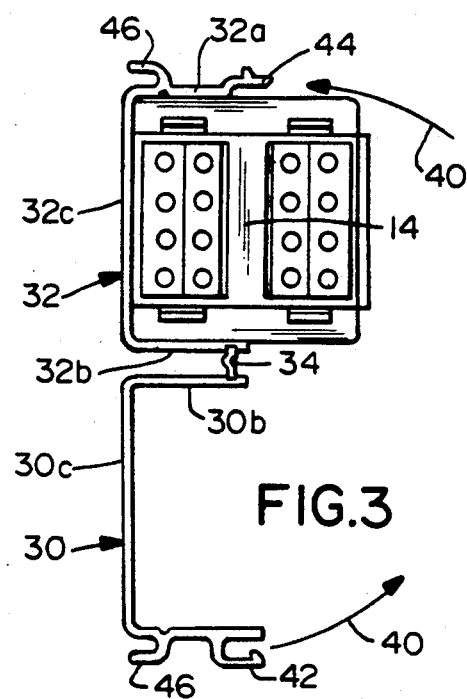
FIG. 3 is a view similar to that of FIG. 2, with the electrical connector in position within one of the raceway sections.
Figure 4:
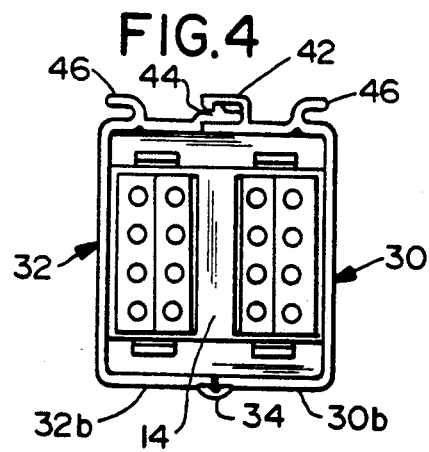
FIG. 4 is a view similar to that of FIGS. 2 and 3, with the raceway sections in closed condition completely encapsulating the connector.
Figure 6:
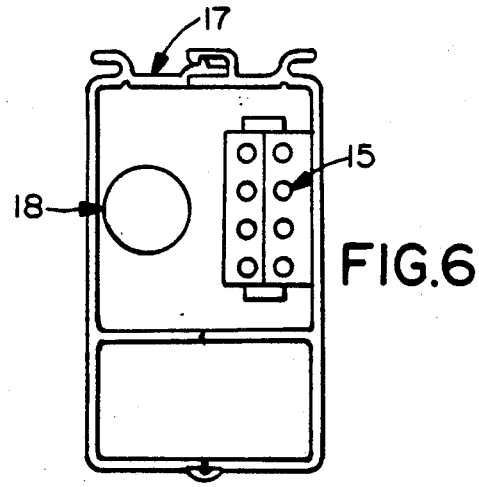
FIG. 6 is an elevational view looking at the left end of FIG. 5 showing the raceway sections in a closed condition with a communication as well as power conduit.
Figure 8:
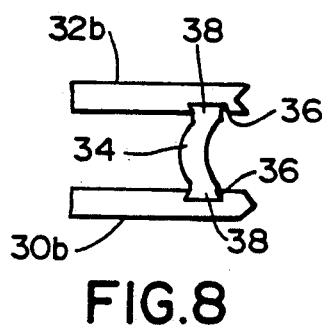
FIG. 8 is a detailed drawing of the web.
Figure 7:
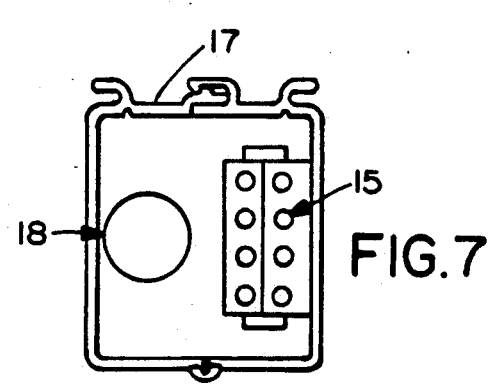
FIG. 7 is a section view looking at the right end of FIG. 1.

Generally, hinge means 34 are interconnected between adjacent longitudinal sides (i.e., legs 30b and 32b) of the raceway sections whereby the sections are movable about the hinge means between an open position (FIGS. 2 and 3) and a closed position (FIGS. 1 and 4). More particularly, hinge means 34 is provided in the form of a web extending lengthwise of the raceway sections. As shown in FIG. 8, the sections have socket means in the form of channels 36 formed in the outside surfaces of legs 30b and 32b. The web has enlarged side edges 38 which are disposed in channels 36 to retain the web in position. The web is fabricated of flexible material so that sections 30 and 32 can pivot from their open position as shown in FIG. 3, in the direction of dotted arrowed line 40 to their closed position as shown in FIG. 4. In the alternative the hinge means may be attached to the longitudinal edges of the raceway sections by chemical, heat or sonic welding methods as available in the prior art.

Generally, raceway sections 30 and 32 include complementary interengaging latch means on the longitudinal sides thereof opposite hinge means 34 (i.e., on legs 30a and 32a) to hold the raceway sections in their closed position. More particularly, as seen in FIGS. 2-4, leg 30a of raceway section 30 is provided with a hook 42 on the outside thereof, and leg 32a of raceway section 32 is provided with a hook receiver or projection 44 on the outside thereof. Therefore, when the raceway sections are moved or pivoted about hinge means 34, such as indicated by dotted arrowed line 40 in FIG. 3, hook 42 will snap behind hook projection 44 as shown in FIG. 4, thereby holding or locking the sections in their closed position surrounding, concealing and protecting the electrical components therein, such as receptacle connector 14.

The raceway sections may be provided with other interior or exterior features commensurate with the usage of the raceway. For instance, hooks 46 are provided on the outside of legs 30a and 32a of raceway sections 30 and 32, respectively. As seen in FIG. 4, the hooks point outwardly in opposite directions. As seen in FIG. 1, the hooks may be used for snapping lips 48 of mounting brackets 22 onto the top of the raceway to eliminate extraneous mounting hardware.

Reviewing the above description, raceway sections 30 and 32 can be fabricated individually and then joined by the hinge means provided by web 34 as shown in FIG. 2 wherein the sections are in their completely open condition. The electrical components which are to be mounted within the raceway, such as electrical connector 14, power wires, communication cables and the like then are positioned within one of the raceway sections, such as section 32 shown in FIG. 3. The other raceway section, such as section 30, then is pivoted to the closed position as shown in FIG. 4, whereupon hook 42 snaps into engagement over hook projection 44. The electrical components now are completely concealed and protected within the raceway which has been provided by only two pivotally connected parts.

Although raceway sections 30 and 32 can be fabricated by molding techniques, it is contemplated that the sections can be extruded together in one piece with the hinge 34 so that they can be cut in any given lengths to provide a raceway 10 of any length for a variety of desired applications.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A longitudinal raceway for housing electrical components comprising:

a pair of elongated raceway sections being generally U-shaped in cross-section with each section having two leg portions joined at proximal ends by a bight portion which, when in longitudinal juxtaposition, define a generally hollow closed structure for concealing and protecting the electrical components;

hinge means connecting the proximal end of one leg portion from each of the raceway sections defining a first set of abutting leg portions whereby the sections are movable about the hinge means between open and closed positions;

complementary interengaging latch means between a second set of abutting leg portions opposite said first set of abutting leg portions to hold the sections in the closed position; and raceway mounting means for mounting said raceway to a fixed structure, said raceway mounting means including at least two elongated channels one on one of a set of abutting leg portions and the other channel on the other of the same set of abutting leg portions, ending in hooks directed opposite one another which mate with lips on cooperating mounting means on the fixed structure.

2. The longitudinal raceway of claim 1 wherein said raceway sections comprise unitary plastic components.

3. The longitudinal raceway of claim 2 wherein said complementary interengaging latch means are unitary with the raceway sections.

4. The longitudinal raceway of claim 3 wherein said complementary interengaging latch means comprise hook means for snapping into locking engagement.

5. The longitudinal raceway of claim 3 wherein said complementary interengaging latch means extend substantially the entire length of the raceway sections.

6. The longitudinal raceway of claim 1 wherein said hinge means comprise a flexible web extending lengthwise of the raceway sections.

7. The longitudinal raceway of claim 6 wherein said raceway sections have socket means and the web has enlarged portions positioned in the socket means.

8. The longitudinal raceway of claim 7 wherein said socket means comprise a channel running along substantially the entire length of each raceway section, and said enlarged portions comprise ribs along opposite edges of the web positioned in the channels.

9. The longitudinal raceway of claim 1 wherein said raceway sections are generally U-shaped in cross-section, with each section having two leg portions joined at proximal ends by a bight portion, and said hinge means and said complementary interengaging latch means are provided at or near the distal ends of the leg portions.

10. The longitudinal raceway of claim 3 wherein each said raceway section has at least one wall which interengages with the wall in the opposition raceway section thereby forming two separate elongated closed sections within said hollow closed structure.

* * * * *